Jan. 6, 1942.   J. H. MORROW   2,268,991
CONVEYING APPARATUS
Filed Aug. 2, 1940   4 Sheets-Sheet 1

Inventor
Joseph H. Morrow
By Pennie Davis Marvin Edmonds
Attorneys

Jan. 6, 1942.  J. H. MORROW  2,268,991
CONVEYING APPARATUS
Filed Aug. 2, 1940  4 Sheets-Sheet 2

Inventor
Joseph H. Morrow

By *Rennie Davis Marvin Plummer*
Attorneys

Jan. 6, 1942.  J. H. MORROW  2,268,991
CONVEYING APPARATUS
Filed Aug. 2, 1940  4 Sheets-Sheet 4

Joseph H. Morrow Inventor

By Pennie Davis Marvin Edmonds
Attorneys

Patented Jan. 6, 1942

2,268,991

UNITED STATES PATENT OFFICE 2,268,991

CONVEYING APPARATUS

Joseph H. Morrow, Hokendauqua, Pa., assignor to Fuller Company, Catasauqua, Pa., a corporation of Delaware Application August 2, 1940, Serial No. 349,538

13 Claims. (Cl. 302—50)

This invention relates to the conveying of pulverized or finely divided material such as Portland cement, pulverized limestone, powdered coal, soda ash, et cetera, in a system in which the material is continuously conveyed through a closed conduit or pipe line to which the material is substantially continuously supplied and in which it is advanced through a short length of the conduit, at the inlet end, by mechanical pressure, and air or other gas is injected beyond the advancing means to aerate the material, whereby the material is conveyed through the remainder of the conduit by the pressure of the expanding gas and the displacement of material from the short length of the conduit, at the inlet end, into the system. More particularly, the invention is concerned with a novel method and apparatus for conveying such materials through closed conduits or pipe lines when the material to be conveyed is supplied at variable rates and sometimes at greater than normal densities, at times greater than the maximum capacity of the system, the safe operating load of the motor driving the material advancing means, or both.

The method and apparatus of the invention constitute an improvement on the conveying system of the type developed by Kinyon and first disclosed in his Patent No. 1,553,539, my Patent No. 1,941,573 and Lenhart Patent No. 2,141,920, the improved system being subject to decreased liability of breakdown and providing substantial economies in operation when used under the conditions above mentioned.

In the system of the Kinyon patent and improvements thereof, the pulverized material to be conveyed is introduced to a cylindrical barrel connected at one end to a transport line, and the material may be supplied to the barrel in various manners, as by gravity descent through a hopper having its discharge opening in communication with the interior of the barrel or the material may be fed to the open end of the barrel opposite its connection to the transport line. A rapidly rotating impeller screw advances the material through the barrel, and the material is compacted in its movement by various means, such as by forming the impeller screw flights of decreasing pitch, the effect of such compacting being to form a seal. At a point immediately beyond the seal air is injected into the material to aerate it, and the material is caused to flow through the transport line by the displacement of material from the barrel into the system and the expansion of the air. The density of the seal required varies considerably under different conditions of operation, and, in a specific system, care is taken to provide a seal which is of no greater density than is necessary, since the use of a denser seal than is needed results in power losses and excessive wear due to friction and at times may even place such a strain upon the driving mechanism as to cause a breakdown as will be developed later.

If the supply of specific material to the pump of a given system is to be constant both for volume and density throughout operation, it is a simple matter to calculate the pressure and volume of air required, with relation to the maximum conveying distance, and to provide for a seal of sufficient density to resist this pressure and prevent rearward escape of air, and to calculate the motor power required to advance the material and overcome the resistance of the seal and back pressure of the system. In such a system, the device is so constructed or adjusted that, under normal operating conditions, a seal will be formed which will resist the maximum back-pressure developed when conveying to the farthest point in the line, and the motor driving the pump is selected to furnish the power required for such condition without overloading.

A serious problem, however, is presented in the use of such conveying systems when the supply of the material entering the system increases substantially above normal, since such an increase may cause serious damage and overloads. The chief cause of this increase in material supply is a change in characteristics of the material from that normally expected, namely an increase in density under certain conditions. There are a number of reasons why the density may increase, the common cause being that, if the material is stored for any considerable length of time, the normal quantity of air admixed with the material gradually escapes. Also the density is increased by the sudden dropping of the material into the feed mechanism from standing walls, or the sudden breakdown of an arch formed in the hopper or feed line of the conveyor, the sudden dropping causing the material to be compressed in the bottom of the hopper or feed line and more than the normal quantity to be forced into and advanced by the screw. The density is likewise increased when the material to be conveyed is withdrawn from silos or the like filled to a substantial height, so that the material at the bottom is compressed. When such conditions are anticipated, it has been the practice to use a larger motor than necessary for the normal load, but this does not completely solve the problem because it will operate at an unfavorable power factor most of the time and, if the overload of the system is more than momentary, incomplete aeration of the material due to the deficiency in compressed air will ultimately overload the system and motor.

In such systems, the overloads may become excessive and even though the motor may be larger than necessary for the normal capacity it may be incapable of forcing the material into the pipe line. Frequently, the density of the material may be moderately excessive for prolonged periods, and the screw motor will continue to run under overload conditions. In the latter case, the increased density of the seal and the high back pressure of the system, resulting from the excess of incompletely aerated material, offers considerable resistance to the injection of air and the air supply pressure must be increased to maintain the same volume flow. In some types of installation, the increase in pressure will not increase the volume flow in order to aerate the excessive quantity of material. The necessity for high inlet pressure of the air supply greatly increases the cost of compressing the air, as the compressor power input increases rapidly, and the compressor efficiency decreases rapidly due to air slippage, as the pressure is raised. The compressor unit usually serves a plurality of pumps, and in order to cause even the normal quantity of air flow into the material in the pump offering increased resistance, higher pressures throughout the entire system are necessary.

In the apparatus of the Lenhart patent, feed discs are utilized to deliver the material to a hood at the end of the conduit, where it is picked up by the screw flights, and it has been attempted in that system to regulate the rate of supply by controlling the operation of the feed discs. This type of control has not proved entirely satisfactory as the material at times continues to enter the hood in an uninterrupted flow even though the feed discs cease to function. When conveying material, for example, from cement mill warehouses, it is customary to place the conveying apparatus in the storage compartment and advance the apparatus until the feed discs enter the material. These feed discs eat into the stored material, which may be very dense due to long storage, and undermine the pile with the result that occasional slides occur which may wholly or partially bury the device. At such times the system becomes overloaded and the feed discs are automatically stopped, but this relatively dense material continues to enter the hood, and completely fill the screw flights. Operation under these conditions places a serious overload on the screw motor, and causes erratic operation with frequent withdrawals of the pump from the material, with considerable reduction in the quantity of material handled in a given time.

The present invention is, accordingly, directed to the provision of a system for conveying pulverized or finely divided material which operates on the Kinyon principle and performs economically for all conditions of variable material supply greater than the full capacity of the system. The new system automatically controls the quantity and characteristics of the material entering the conduit or pipe line when the supply increases above normal and thus maintains a uniform rate of conveying within the system's normal capacity. The new system uses relatively low transport line and inlet pressures with a minimum differential between them under all conditions of variable material supply, thus effecting economies in power represented by compressor pressure and input to the pump motor, because of the decreases in force represented by back pressures which the pump must overcome, and in the friction of the material advanced by the screw. The new system accordingly affords the advantage of continuous conveying, with excellent economy.

In the practice of the new method, pulverulent or finely divided material is supplied to the conduit through which it is to be conveyed, pressure is applied to the material within the conduit to advance and compact the same, and immediately beyond the point of pressure application air or other gas is injected into the conduit in sufficient quantity to fluidize the material. Through the combined action of the pressure applied and the natural expansion of air injected, the material is caused to flow through the conduit. When the rate at which the material is supplied to the conduit increases above that normally expected, and for which the system is adapted, additional air or other gas is injected into the material in the vicinity of the inlet to the conduit or barrel in order to restore it to its normal density i. e. that which was anticipated when the system was designed. Since the actual quantity of material being advanced by the impeller screw, or other mechanical means, at any time is immediately reflected in the power load on the screw driving motor, the air, supplied to decrease the density of the material by limited aeration, is controlled by mechanism responsive to a predetermined motor load. Mixture of the air and material is completed almost instantly by the agitating effect of the rapidly rotating screw. As soon as the load on the motor drops to a predetermined safe limit, the air supply is cut off to prevent excessive aeration which would destroy the material seal essential to the operation of the system. Should the abnormal density condition of the material supply continue more than momentarily, the air is supplied as a series of injections to limit the quantity to the minimum necessary to overcome the condition. The apparatus is made adjustable whereby the material is conveyed consistently at the maximum capacity corresponding to the most efficient motor operating load. By so aerating the material at times of increased density the rate at which the material is conveyed is maintained substantially uniform regardless of increases in material supply. By use of the present method and apparatus, it is therefore, possible to start the system and leave it unattended with assurance that a constant and uniform rate of conveying will be maintained, and that the system will not be called upon to handle material in such quantity as to result in damage to or stoppage of the system.

For a better understanding of the invention reference is made to the accompanying drawings illustrating apparatus suitable for the practice of the new method. In the drawings Fig. 1 is a side elevation partly in section of one form of the device.

Figure 1:
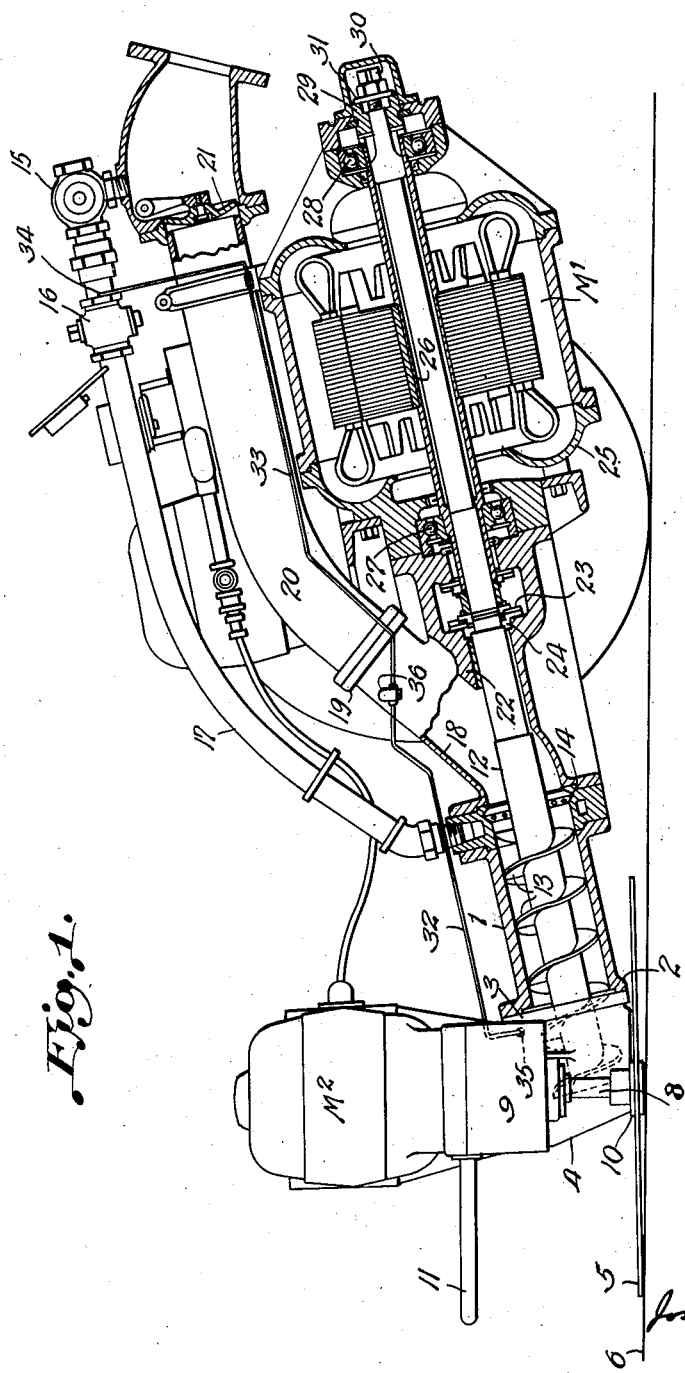
Figure 2:
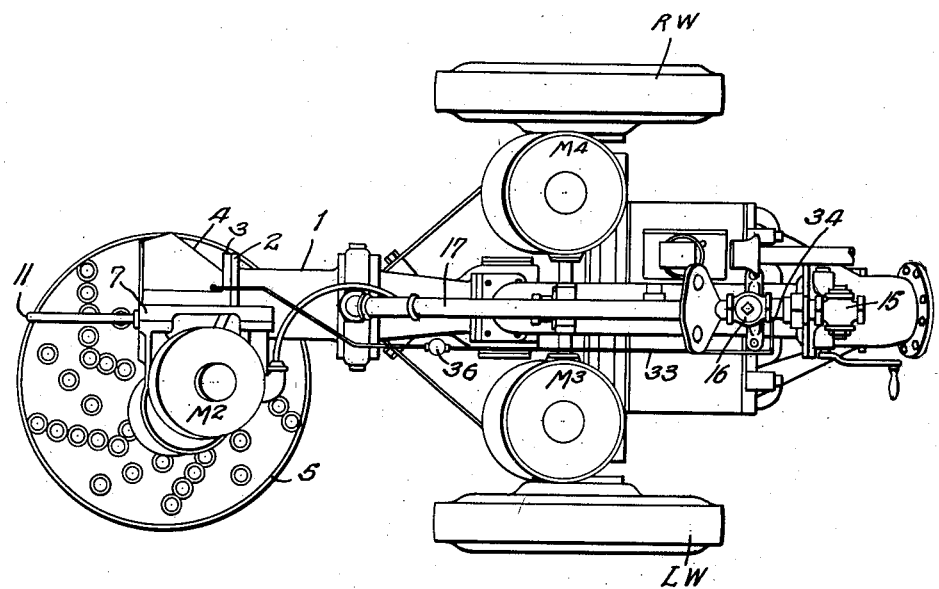
Fig. 2 is a top plan of the apparatus shown in Fig. 1.
Figure 3:
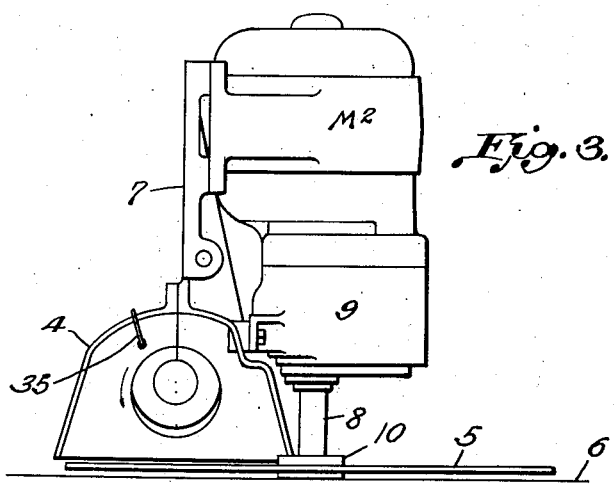
Fig. 3 is a front elevation of the feeder assembly of the device of Fig. 1.

The apparatus shown in Figures 1–3 is of the portable type and involves the use of certain features of construction disclosed in the Lenhart patent. The apparatus includes a barrel 1 having a flange 2 attached to the flange 3 of the hood 4, the hood being flared outwardly at its bottom to span one side of a feed disc 5, lying approximately parallel with the floor 6 upon which the material is stored. The feed disc driving assembly which includes a motor M2, is supported on the hood 4 by a support 7 secured thereto and the motor drives the disc 5 through the shaft 8 and a built-in speed reducer 9, the details of which are not shown. The shaft 8 is secured to the disc 5 by suitable flanges as indicated at 10, the lower flange supporting the disc out of actual contact with the floor. A rod 11 secured to the support 7 extends forward of the device to prevent contact of the disc with the walls of the enclosure in which the material is stored.

An impeller screw 12 having flights 13 is arranged within the barrel in the usual manner with a portion thereof extending beyond the barrel and into the hood so as to receive the material supplied by the feed disc. The pitch of the flights decreases toward the terminal flight and the latter is spaced from a source of air indicated as an air ring 14. Compressed air for aerating the material is injected through the air ring from any suitable source of supply which may be connected through the three way cock 15, a regulating valve 16, and the pipe line 17 to the ring. Beyond the air ring 14 and secured to the barrel 1 is a discharge elbow 18 suitably flanged at 19 and connected to a portion of the conduit 20 which forms an extension of the elbow. A check valve 21 of the gravity type normally closes the end of the conduit 20, this valve being lifted from its seat by the flow of material through the conduit.

The screw shaft 12 extends through a wall of the elbow 18 and a housing 22 enclosing an oil seal 23 and the housing is chambered at 24 and supplied with air in any suitable way from the connection 17, to prevent dust from moving rearwardly along the shaft. The housing is secured to the forward end-bell 25 of a motor M1, and the shaft is enclosed within a bushing 26 to which the motor is secured. The bushing 26 is supported for rotation in a bearing 27 in a chamber in the forward end-bell 25 and a radial bearing 28 is similarly arranged in the rear end-bell. Beyond bearing 28, the shaft 12 is secured to the bushing by key-ring 29 which surrounds a reduced section of the shaft, the key-ring being secured by a nut 30, spaced from the key-ring by one or more washers 31, the function of which is to permit longitudinal adjustment of the shaft 12 to modify the "seal" distance between the terminal flight and the air ring 14.

The wheels LW and RW of the apparatus are individually driven by independent motors M3 and M4 which may be operated to move the apparatus in any desired direction.

At times of increased material supply to the barrel 1, the motor M1 becomes overloaded in an attempt to advance this material and further force it past the seal. When the overload on the motor reaches a predetermined point, the motor operating the feed disc is automatically stopped in an attempt to reduce the quantity of material entering the barrel, but experience has shown that the stopping of the feed disc does not always prevent admission of material at a rate greater than the capacity of the system, as the material continues to flow into the hood because of its fluid nature. At such times an aerator indicated generally at 32 operates to reduce the quantity of material entering the barrel. This aerator comes into operation when the feeding means are either operating or stopped, but for purposes of explanation, the aerator shown starts to operate upon the stopping of the feeder disc motor M2. Operation of the feeder motor M1 is controlled by an adjustable instantaneous overload relay positioned in the screw motor circuit, the relay releasing the starter of the feeder motor M2 upon increase of the load on the screw motor to a predetermined point.

Figure 5:
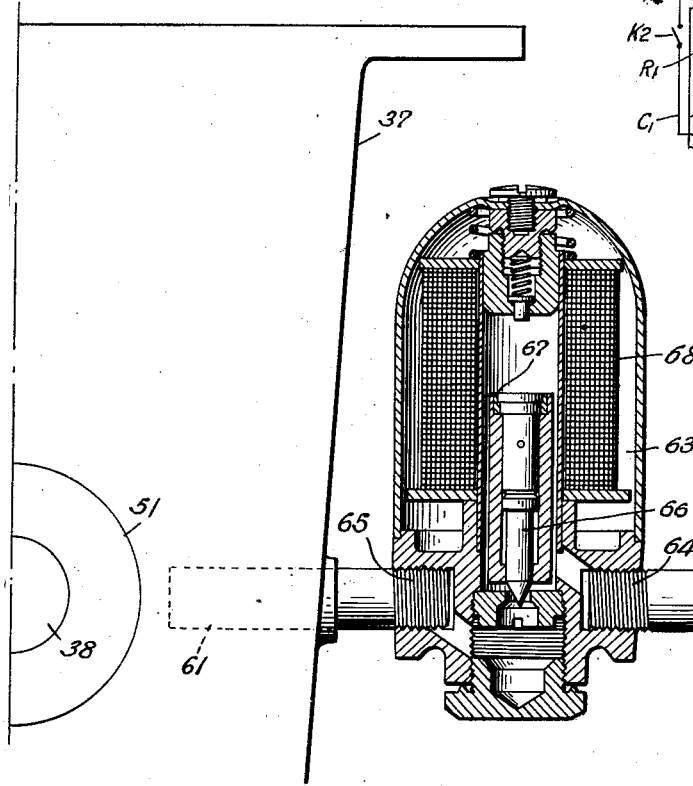
Fig. 5 is an enlarged detail section taken on line 5—5 of Fig. 4.

The aerator includes an air line 33 which receives air at full line pressure from the main air supply and is connected to this source between the valves 15 and 16 as at 34. The other end of the line 33 terminates in an injector outlet 35 within the hood 4, adjacent the barrel opening. The most effective results are obtained with the injector positioned as close as possible to the flights of the screw 12 and as close to the barrel opening as practical, but beneficial results are also obtained by supplying the aerating medium to the material at any point within the hood. Within the air line 33 is a solenoid operated valve 36 for controlling the flow of air therein. When an increased quantity of material is fed to the barrel 1 by the screw 12, the load upon the motor M1 is increased and at times this increase may detrimentally affect the motor. By suitable connections, the valve 36 is opened when the motor overload reaches a predetermined point, and air is injected into the material prior to its confinement in the barrel to reduce the quantity of material advanced by the screw to that normally expected. As a result of this reduction, the load upon the motor M1 drops to normal. Upon return of the motor to normal operating conditions, valve 36 is caused to close, and remains in this position until the load on the motor M1 again increases to the predetermined point. The details of the solenoid operated valve are shown in Fig. 5, where it is applied to a modified form of the conveying system, and the details of this valve will be explained in the description of this modification.

Figure 7:
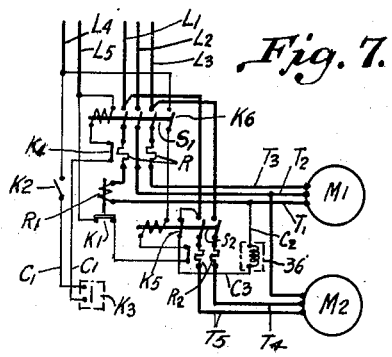
Fig. 7 is a schematic wiring diagram of the power and control circuits for the device shown in Fig. 1.
Figure 6:
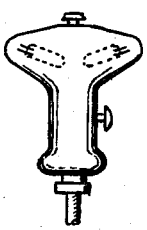
Fig. 6 is a side elevation of the control switch assembly.

The power and control circuits for the screw and feeder motors, and the solenoid operated valve for the apparatus just described are illustrated schematically in Fig. 7. As there shown, power lines for the two motors are represented by the lines L1, L2, and L3, and the motors are provided with starters having actuating circuits represented by lines L4 and L5. A full voltage magnetic starter S1 controls the operation of the screw shaft motor M1, the starter being provided with the usual contacts for energizing motor circuits T1, T2, and T3. These circuits include two thermal overload relays indicated generally at R. Circuit T1 includes an adjustable instantaneous overload relay R1 of the type actuated by a solenoid and released to close the contacts by gravity, the relay having contacts K1 in the actuating coil circuit of starter S2 for motor M2. This starter is likewise of the full voltage magnetic type and is provided with similar thermal overload relays R2 in the circuit of the feeder motor M2, the circuits being represented by the lines T4 and T5 and common wire T2, the starter having only two contacts as the circuit through the common wire is closed by starter S1.

Starter S1 for the screw shaft motor M1 is actuated by a contact switch K2, the contacts of this switch closing the power supply line L4 and control circuit line C1. Line C1 includes an air pressure actuated switch K3 and an overload relay switch K4, the latter forming a part of thermal overload relay R, the circuit being completed by the power supply line L5, through the actuating coil of the starter S1.

Closing of the contact switch K2 closes the starter S1 and simultaneously causes closing of auxiliary contacts K6, forming a part of the starter. Closing of contacts K6 closes the power supply through line L4 to the actuating coil of the starter S2, the opposite side of that coil being fed by the normally closed contacts K1 of the instantaneous overload relay R1. Supplying current to the actuating coil causes closing of starter S2 simultaneously with starter S1, and thereby both the screw shaft motor M1 and the feeder motor M2 are started together.

The closing of starter S1 is only possible when a switch K3 is closed in response to pressure in the air supply line. Switch K3 is of the conventional diapragm type and may conveniently be connected to the air supply through suitable tubing from the connection 17. Should the air supply pressure to the air-ring 14 drop below a predetermined point, this switch will open, de-energizing the actuating coil and releasing starters S1 and S2, thus causing the pump to stop before un-aerated material is forced into the conduit 20.

The instantaneous overload relay R1 is one actuated at about 150% of full load, at which time it will open the contacts K1, thereby releasing starter S2 and stopping the feeder motor M2. The stopping of the feeder, however, does not necessarily relieve the overload upon the motor M1, as previously explained.

The solenoid controlled valve 36 has one wire C2 permanently connected to the circuit T1 of the motor M1 and the other wire connected through C3 to one pole of switch K5. The switch K5 is carried by the starter S2 and is normally open when the starter S2 is closed and motor M2 operating. Upon overload of the motor M1 starter S2 is opened and switch K5 is closed, thereby energizing the solenoid to open the valve to permit air to flow in the line 33. It has been found to be desirable to cause the contactor of the relay R1 to fall by gravity, when the load of the motor drops to about 125%, this action causing the closing of the starter S2 and opening of switch K5 to close the air valve controlled by the solenoid. It is to be understood that this range of operation is not critical and may be adjusted to suit the characteristics of the screw shaft motor.

Figure 4:
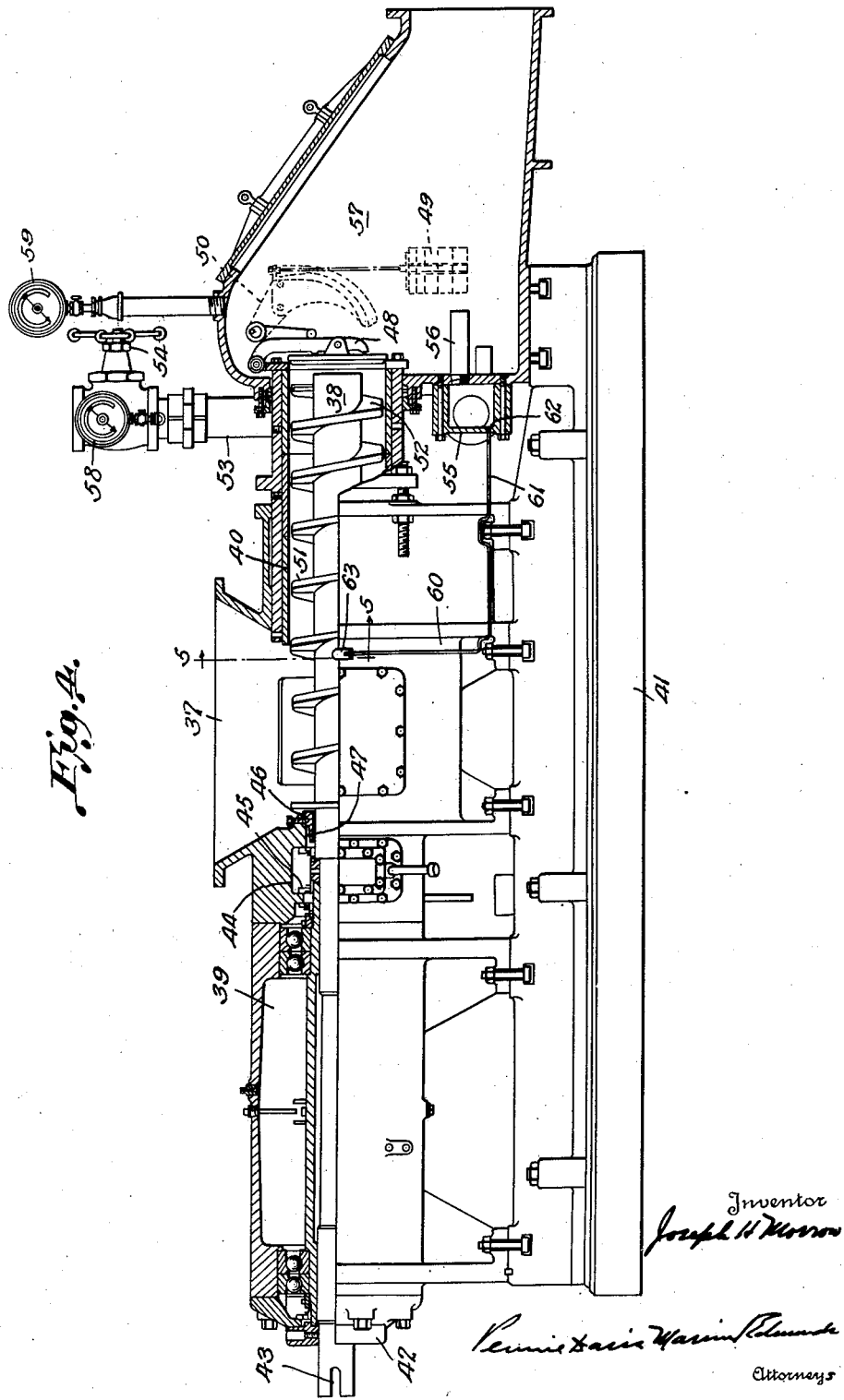
Fig. 4 is a side elevation partly in section of another form of the device.

Another form of the apparatus is illustrated in Fig. 4, and includes a hopper 37, receiving a continuous supply of material from any suitable source not shown. The material entering the hopper 37 is advanced and compacted in a barrel 40 by the rotation of a shaft 38 having screw flights 51 extending through the hopper and into the barrel. The shaft 38 is supported in bearing 39, the end of which extends through the bearing head 42 and terminates in a key-way 43 so that the shaft may be coupled to any suitable prime mover, such as an electric motor (not shown). In a housing 44 surrounding the shaft, an oil seal 45 and gland 46 prevent the material from passing rearwardly into the bearing.

The material entering the hopper is carried forward by the rotation of the screw, the flights of which progressively decrease in pitch so as to compact the material near the terminal end of the screw. A flap valve 48 assisted to its closed position by counter-weight 49 through bell crank 50, insures the compacting of the material at the terminal flight of the screw, and under normal operating conditions this valve is lifted off its seat by the flow of the material through the barrel.

The material entering the mixing chamber 57 is aerated by blasts of compressed air supplied through air line 53, manifold 55, and injector pipes 56. The air supply to the chamber is controlled by valve 54 and air pressure gauges 58 and 59 record the pressures in the air line and discharge line, respectively.

When abnormally dense material enters the hopper 37 and is advanced and compacted by the screw, a heavy overload is placed upon this driving motor. To overcome this overload condition, an aerating means denoted generally at 60 automatically acts when the load on the driving motor reaches a predetermined point to reduce the density of the material being confined in the barrel and thus reduce the load upon the motor.

The aerating means comprises a pipe line 61 receiving air from the manifold 55 to which it is connected as at 62. The terminal end of the air line 61 is placed adjacent screw flights 51 and adjacent the barrel opening, in order that the material supplied may be aerated prior to confinement within the barrel. As the flow of air in line 61 is necessary only at those times when the material supply is greater than that normally expected, a solenoid operated valve indicated generally at 63 permits the passage of air in the line upon a predetermined rise of the power required to advance the material. This solenoid operated valve comprises an inlet 64 and an outlet 65, a needle valve 66 carried by an armature 67 controlling the passage of air from the inlet to the outlet. An operating coil 68 raises the armature 67 carrying the valve when the current to the motor increases to a predetermined point.

Figure 8:
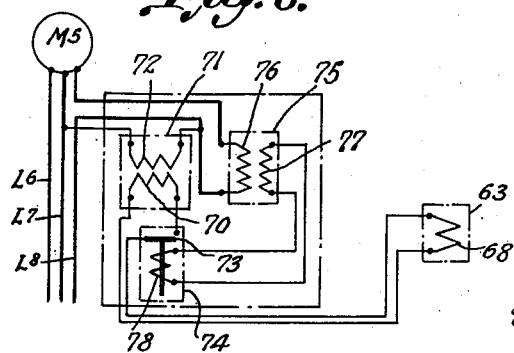
Fig. 8 is a schematic wiring diagram for the control of the valve of Fig. 5.
Figure 9:
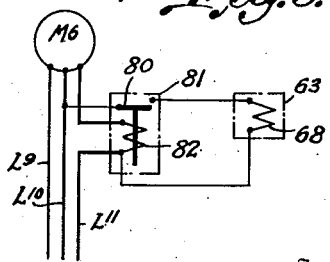
Fig. 9 is a schematic wiring diagram for a modified control of the valve of Fig. 5.

Two possible connections of the operating coil of the valve to the power lines for the screw motor have been illustrated schematically in Figs. 8 and 9. In the hook-up shown in Fig. 8 which may be used when the system requires high voltages, the operating coil of the valve 63 is energized by the secondary coil 70 of a potential transformer 71 whose primary coil 72 is connected across the service lines L7 and L8 which connect the screw motor M5 to its source of power. The circuit from the secondary coil 70 and coil 68 is normally open, and may be closed by the contactor 73 of an adjustable, instantaneous overload relay 74, whose operating coil 78 is energized by the secondary coil of a current transformer 75, the primary coil of which is placed in the line L8. The relay 74 may be set for various line currents but it has been found to be desirable to have the relay actuate at about 150 percent of full load of the screw motor M5 at which time the circuit to the solenoid operated valve is completed, and air is caused to flow into the dense material. The contactor of the relay falls by gravity, when the load of the motor M5 drops to about 125 percent.

When smaller motors are used the transformers may be eliminated and the circuits shown in Fig. 9 employed. In that hook-up the solenoid operated valve 63 has its operating coil 68 connected across the power lines L10 and L11 at times of increased current to the screw motor M6. An adjustable, instantaneous relay 81 having its actuating coil 82 in the power line L11 completes the circuit through the coil 68 when the current in power line L11 rises to a predetermined point.

When either of the systems illustrated encounters an abnormally dense material, the overload of the screw motor results in practically instantaneous rise in the motor current, since the dense material travels from the feed end of the barrel to the seal rapidly because of the high speed of the screw. The reaction of the control means for the aerating mechanism is likewise instantaneous, so that the duration of extreme overload of the screw motor is extremely short and no detrimental effect upon this motor results. The system may be started and left to run without an attendant with assurance that material of varying densities will be handled without the possibility of damage of the motor and that a flow of a uniform quantity of material will take place. By the maintenance of a uniform flow through the conduit, the difference between the inlet pressures and the line pressures may be maintained with a minimum differential, and savings are thus made in the compressor costs.

I claim:

1. An apparatus for conveying pulverulent material of variable density which comprises in combination, a conduit through which the material is advanced, means directing material to the conduit, means within the conduit for applying pressure to advance and compact the material, driving means for the pressure applying means, a gas injector beyond the point of pressure application to aerate the material, means to aerate the material prior to its entry into the conduit at times of increased density, and means responsive to predetermined power requirement of the pressure applying driving means controlling operation of the last named aerating means.

2. An apparatus for conveying pulverulent material of variable density which comprises in combination, a conduit through which the material is advanced, means directing material to the conduit, a screw conveyor within the conduit for applying pressure to advance and compact the material, a motor having a driving connection with the screw conveyor, a gas injector beyond the point of application of pressure to aerate the material, a second gas injector adjacent the conduit entrance to aerate the material prior to its confinement in the conduit at times of increased density, and means responsive to predetermined power requirements of the motor controlling operation of the second gas injector.

3. An apparatus for conveying pulverulent material of variable density which comprises in combination, a conduit through which the material is advanced, means directing material to the conduit, pressure applying means within the conduit to advance and compact the material, a motor driving the pressure applying means, a gas injector beyond the point of application of pressure to aerate the material, normally inoperative means to aerate the material prior to its entry into the conduit, and means responsive to predetermined power requirements of the driving motor controlling the operation of the normally inoperative aerating means.

4. An apparatus for conveying pulverulent material of variable density which comprises in combination, a conduit through which the material is advanced, means directing material to the conduit, a screw conveyor within the conduit for applying pressure to advance and compact the material, a motor having a driving connection with the screw conveyor, a gas injector beyond the point of application of pressure to aerate the material, a second gas injector adjacent the conduit entrance to aerate the material, a conduit connecting the second injector to a source of gas supply, and means responsive to the motor power requirements controlling the flow of gas through the last named conduit to the injector.

5. An apparatus for conveying pulverulent material of variable density which comprises in combination, a conduit through which the material is advanced, means directing material to the conduit, means within the conduit for applying pressure to advance and compact the material, a motor having a driving connection with the pressure applying means, a gas injector beyond the point of application of pressure to aerate the material, a second gas injector adjacent the conduit entrance to aerate the material, a conduit connecting the second injector to a source of gas supply, a valve in the conduit, and means responsive to a predetermined power requirement of the motor controlling the operation of the valve.

6. An apparatus for conveying pulverulent material of variable density which comprises in combination, a conduit through which the material is advanced, means directing material to the conduit, a screw conveyor within the conduit for applying pressure to advance and compact the material, a motor having a driving connection with the screw conveyor, a gas injector beyond the point of application of pressure to aerate the material, a second gas injector adjacent the conduit entrance to aerate the material, a conduit connecting the second injector to a source of gas supply, a valve in the conduit, and means responsive to the power requirements of the motor controlling the operation of the valve.

7. An apparatus for conveying pulverulent material of variable density which comprises in combination, a conduit through which the material is advanced, means directing material to the conduit, a screw conveyor within the conduit for applying pressure to advance and compact the material, an electric motor having a driving connection with the screw conveyor, a gas injector beyond the point of application of pressure to aerate the material, a second gas injector adjacent the conduit entrance to aerate the material, a conduit connecting the second injector to a source of gas supply, a valve in the conduit, a solenoid controlling the opening and closing of the valve, and means responsive to the power requirements of the motor controlling operation of the solenoid.

8. A device for conveying pulverulent material of variable density which comprises in combination, a conduit through which the material is advanced, a conveyor for advancing and applying pressure to the material, a motor for driving the conveyor, feed means to supply material to the conveyor, a motor for driving the feed means, a gas injector at a point immediately beyond the point of pressure application to aerate the material in the conduit, a second gas injector operative to reduce the density of the material prior to its confinement in the conduit at predetermined periods, a stopping mechanism responsive to an overload on the driving motor for the conveyor to stop the feed means, and means responsive to the feed stopping mechanism controlling the operation of the second gas injector.

9. An apparatus for conveying pulverulent material through a pipe line to which the material is sometimes supplied at variable rates and densities which comprises mechanical means advancing the material into the pipe line, power means to drive the advancing means, means for injecting air into the material in the pipe line at a point beyond the mechanical means, a compressed air supply conduit opening into the apparatus at a point in advance of said mechanical means, a valve in said conduit and means for operating the valve responsive to a predetermined power load limit whereby the valve is operated to open position at times of increased power load to permit partial aeration of the material to decrease its density and its rate of advance by said mechanical means.

10. An apparatus for conveying pulverulent material through a pipe line to which the material is sometimes supplied at variable rates which comprises mechanical means to deliver the material to the pipe line, an electric motor to drive the mechanical means, means to inject compressed air into the material at a point beyond the mechanical means, a compressed air supply conduit opening into the apparatus at a point in advance of the said mechanical means, a valve in said conduit and means for operating the valve responsive to a predetermined electric power input to the motor whereby the valve is operated to open position at times of increased power load to permit partial aeration of the material to decrease its density and its rate of advance by said mechanical means.

11. A pump for conveying pulverulent material comprising a barrel in which the material is advanced and compacted to form an air seal, a rapidly rotated impeller screw to advance and compact the material, an electric motor to drive the impeller screw, means to inject air into the material at a point adjacent to but beyond the point of seal formation, an air supply conduit opening into the apparatus near the entrance to the barrel, a valve in the conduit, and electrical means for operating the valve including an element in the power circuit of the motor responsive to a predetermined electric power input to the motor for opening the valve partially to aerate the material to decrease its density and its rate of advance by said screw.

12. A device for conveying pulverulent material of variable density which comprises in combination, a conduit through which the material is advanced, a conveyor for advancing and compacting the material, a motor driving the conveyor, feed means to supply material to the conveyor, a motor driving the feed means, a starter controlling the operation of the feed motor, a gas injector at a point beyond the point of pressure application to aerate the material, a second gas injector operative to reduce the density of the material prior to its confinement in the conduit, a solenoid operated valve controlling the flow of gas in the second injector, a relay operable upon a predetermined overload on the conveyor motor to release the feed motor starter and stop the feed means, and means operable upon release of the feed motor starter to energize the operating coil of the solenoid valve to cause the valve to open.

13. An apparatus for conveying pulverulent material of variable density which comprises in combination, a conduit through which the material is advanced, means supplying material to the conduit, a screw conveyor within the conduit for applying pressure to advance and compact the material, an electric motor having a driving connection with the screw conveyor, a gas injector beyond the point of application of pressure to aerate the material, a second gas injector adjacent the conduit entrance to aerate the material, a conduit connecting the second injector to a source of gas supply, a valve in the conduit, a solenoid controlling the opening and closing of the valve, a relay operable upon a predetermined rise in the conveyor motor current to connect the operating coil of the solenoid valve to a source of power whereby the valve is opened and gas injected into the material supply.

JOSEPH H. MORROW.